(No Model.)
J. W. BRAGGER.
FLUID SEAL TRAP.
No. 592,690. Patented Oct. 26, 1897.
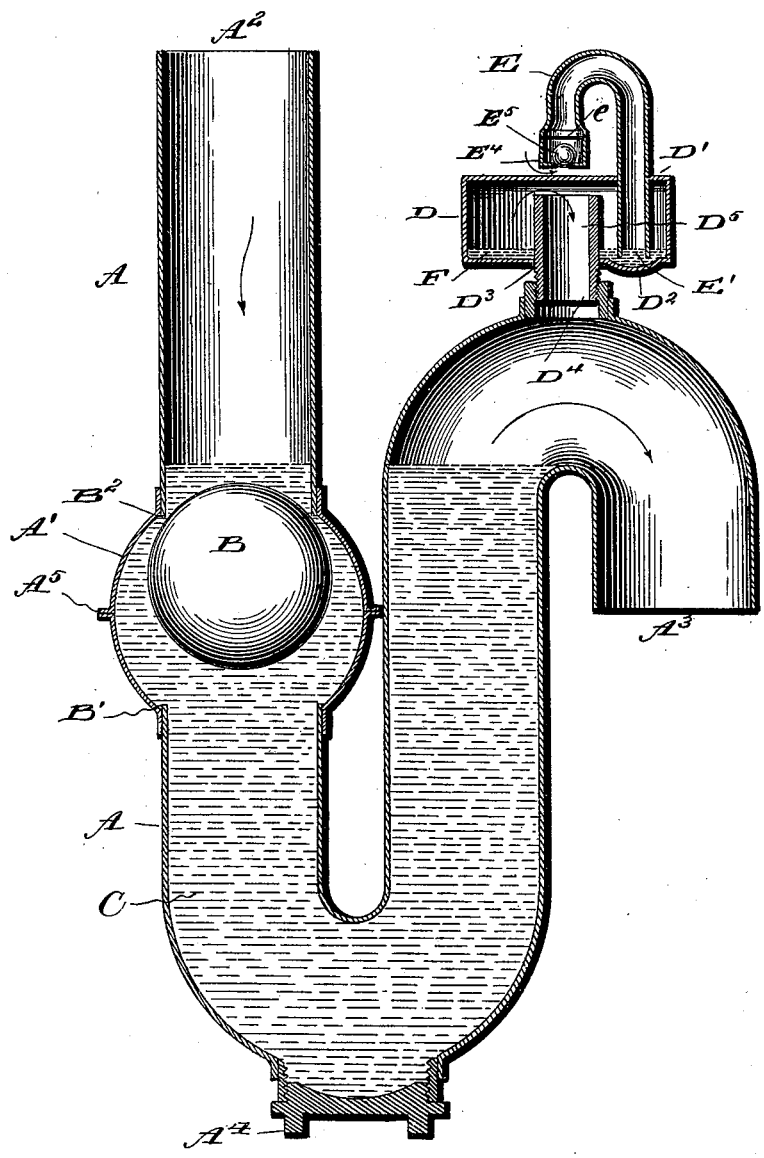
Witnesses
L. C. Hills.
A. L. Hough
Inventor
John W. Bragger
by Franklin H. Hough
Attorney

UNITED STATES PATENT OFFICE.

JOHN W. BRAGGER, OF WATERTOWN, NEW YORK, ASSIGNOR TO THE HITCHCOCK LAMP COMPANY, OF SAME PLACE.

FLUID-SEAL TRAP.

SPECIFICATION forming part of Letters Patent No. 592,690, dated October 26, 1897.

Application filed June 26, 1897. Serial No. 642,403. (No model.)

*To all whom it may concern:*

Be it known that I, JOHN W. BRAGGER, a citizen of the United States, residing at Watertown, in the county of Jefferson and State of New York, have invented certain new and useful Improvements in Fluid-Seal Traps; and I do declare the following to be a full, clear, and exact description of the invention, such as will enable others skilled in the art to which it appertains to make and use the same, reference being had to the accompanying drawing, and to the letters of reference marked thereon, which forms a part of this specification.

This invention relates to certain new and useful improvements in sanitary traps for sinks, basins, or other purposes, and especially in the provision of a water-seal trap that will not lose its seal by siphonage, and thus prevent any escape of the sewer-gas.

The invention relates more specifically to the provision of a water-seal trap having an ordinary ball-valve in an enlarged portion of the trap, and also in providing a means for the ingress of air in case of any formation of a vacuum, which would have a tendency to break the seal, the said means for allowing the ingress of air being a mercury-trap attached to the upper bend of the water-trap and which, while allowing air to enter the water-trap, will prevent the escape of any gases coming from the main.

To these ends and to such others as the invention may pertain the same consists, further, in the novel construction, combination, and adaptation of parts, as will be hereinafter more fully described, and then specifically defined in the appended claims.

The invention is illustrated in the accompanying drawing, which, with the letters of reference marked thereon, forms a part of this specification, and in which drawing I have represented in the figure a vertical central section through my improved trap.

Reference being had to the details by letter, A designates the casing of the water-trap, to which may be secured the shell portions A', which are of larger diameter than the trap proper and secured together by flanges $A^5$, this enlarged portion being for the reception of the floating-ball valve B, which may be seated against the portions of the trap connected to the said shells A' in order to prevent the backflow of water or gases into the pipe system. At the lower end of the trap is a screw-threaded plug $A^4$, provided for the purpose of allowing access to the trap for the purpose of cleansing the same. At the upper and downwardly-bent portion of the trap at its highest point is an aperture in which a plug $D^4$ is secured, in which a screw-threaded tubing is fastened, the upper end of which opens into the chamber formed by the casing D, which is secured to the said tubing in a water-tight manner. This casing has a depression therein, as indicated at $D^2$, which depression is directly underneath the lower open end of the pipe E, which has its upper end downwardly bent and opening into the outside atmosphere, as shown at $E^2$. This pipe E passes through the upper wall of the casing D and has a water and air tight connection therewith.

In order to prevent the escape of any sewer-gas which might pass through the opening $D^4$ into the chamber within the casing D, I place mercury F in the bottom of the casing and in such quantity as to keep the lower end of the tubing E constantly under the surface of the said mercury, so that while in the case of the partial formation of a vacuum in the water-trap, which would have a tendency to unseal said trap, air will be allowed to enter the seal and break up the vacuum, the air entering through the said tube, while the mercury at the lower free end thereof will prevent the escape of any gases from the sewer or other main to which the trap may be connected.

At the inlet end of the pipe E is an enlarged portion $E^4$, having a contracted inlet about which a ball-valve $E^5$ may be seated. In order to prevent the ball from jumping up and closing the pipe leading to the shell or casing containing the mercury, as when taking air, a pin $e$ is provided, which is supported in the walls of the enlarged portion of the said pipe and against which the ball contacts as it is carried up by the force of the air which rushes in through the tube in order to fill the space within the trap formed by the partial vacuum.

My object in providing the ball-valve above described is to guard against any sudden back pressure or reaction in the outlet of the trap, which sometimes occurs, which would force the mercury up and out through the pipe E with a sudden puff. As the ball closes the opening, no air can pass out and the mercury cannot rise with a sudden jar.

The casing and the pipe may be of any suitable material that will not become amalgamated by the mercury contained therein, and the general form and shape of this trap may be changed, if desired, without departing materially from the spirit of the invention.

When the trap is in operation, the water passes from the inlet $A^2$ around the ball-valve B and through the trap and outlet $A^3$. When the water has ceased to flow, the water-level is as shown in the drawing. If at any time a vacuum should form in the outlet-pipe, (as it often does in ordinary traps,) the water that would form the seal against the gas, or a great portion of it, would be drawn through the outlet, thereby destroying the seal, and gas would in a great many cases pass through it freely. In my trap the ball B would be drawn against the seal B', and as no air could enter through the inlet of the trap the vent then acts, the air being drawn through the inlet-pipe E and thence through the mercury F, that surrounds the outlet E, and then through the inlet $D^5$ and outlet $D^4$ of the pipe E.

When the vacuum is broken, the mercury closes around the outlet of pipe E, allowing no gas or odor to escape. Should a back pressure form, the mercury would be forced up to pipe E and the ball against the seat $B^2$.

It will be seen that the quantity of mercury covering the large area of the bottom of the casing D would be forced to a great height in the pipe E before the supply would be exhausted or the outlet of the pipe E exposed, the area of the pipe E being so small.

I am aware that it is old in the art to use floating-ball valves in sewer-pipes operated substantially in the manner shown and described in my application. Hence I do not claim, broadly, such construction, but my claims are to the general construction, which is illustrated in the drawing and which will be specifically defined in the appended claims.

Having thus described my invention, what I claim to be new, and desire to secure by Letters Patent, is—

1. In combination with the water-seal trap, and ball floating in an enlarged portion thereof, the shell or casing D containing mercury, a communicating passage-way between said shell and the water-trap, and the pipe E, passing through the wall of the said shell, and having its lower end beneath the surface of the mercury, substantially as shown and described.

2. In combination with the water-seal trap having a floating-ball valve therein, the tubing $D^3$, connected with the trap at its highest portion, the shell D mounted thereon, one portion of the bottom of said shell having a depression $D^2$ designed to hold mercury, the tube E having its upper end downwardly bent, the said tube passing through the upper wall of the shell and having air-tight connection therewith, and its lower end immersed in mercury, all substantially as and for the purposes set forth.

3. In combination with the water-seal trap, the tubing $D^3$ connected with the trap at its highest portion, the shell D mounted thereon, one portion of the bottom of the said shell having a depression $D^2$ designed to hold mercury, the tube E passing through the top of the shell and having its upper end enlarged and downwardly bent, its lower end dipping below the surface of the mercury, a ball-valve seated in said enlarged portion, and a stop to limit the upper throw of said valve, all substantially as shown and described.

In testimony whereof I affix my signature in presence of two witnesses.

JOHN W. BRAGGER.

Witnesses:
I. J. MORRIS,
CORA L. SHERMAN.